Figure 1:
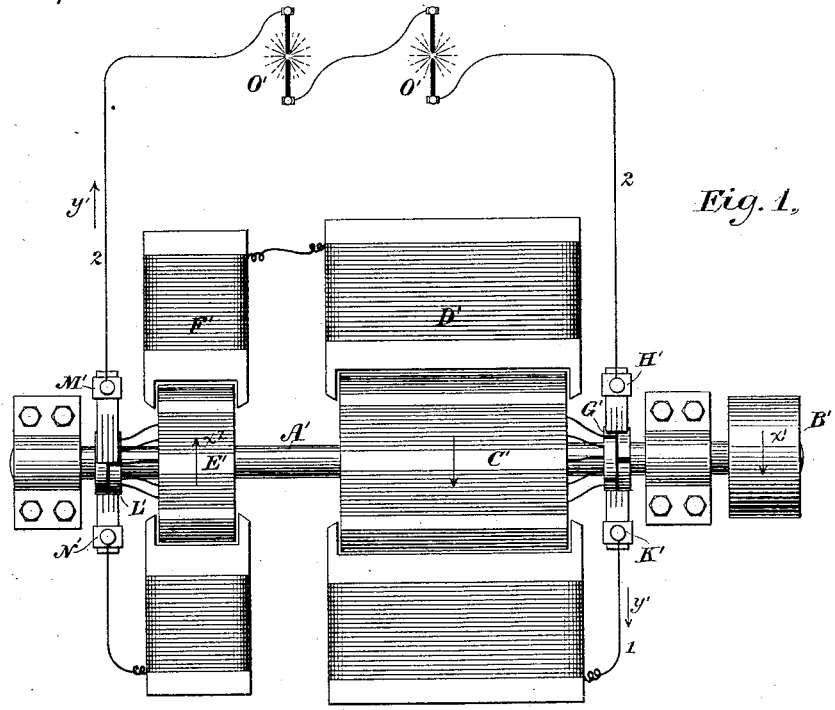

(No Model.) 2 Sheets—Sheet 1.

R. J. SHEEHY.
REGULATOR FOR DYNAMO ELECTRIC MACHINES.

No. 307,684. Patented Nov. 4, 1884.

WITNESSES
Wm A. Skinkle
Geo. W. Breck

INVENTOR
Robert J. Sheehy,
By his Attorneys
Pope Edgecomb & Butler (No Model.)  2 Sheets—Sheet 2.

R. J. SHEEHY.
REGULATOR FOR DYNAMO ELECTRIC MACHINES.

No. 307,684. Patented Nov. 4, 1884.

WITNESSES
Wm A. Skinkle
Geo. W. Breck

INVENTOR
Robert J. Sheehy,
By his Attorneys
Pope, Edgcomb & Butler

UNITED STATES PATENT OFFICE.

ROBERT J. SHEEHY, OF NEW YORK, N. Y.

REGULATOR FOR DYNAMO-ELECTRIC MACHINES.

SPECIFICATION forming part of Letters Patent No. 307,684, dated November 4, 1884.

Application filed January 11, 1883. Renewed March 13, 1884. (No model.)

*To all whom it may concern:*

Be it known that I, ROBERT J. SHEEHY, a citizen of the United States, residing in the city, county, and State of New York, have invented a new and useful Improvement in the Methods of Electric-Current Regulation, of which the following is a specification.

My invention relates to certain systems and devices which have for their object the regulation of the strength of the electrical currents established upon a circuit of conductors by the rotation of a generating-armature within a field of magnetic force.

The object of my invention is to automatically maintain within the circuit of an electric generator of the dynamo or magneto electric types an approximately uniform strength of current, or, more properly speaking, to restore the current to its normal strength when for any reason it varies or tends to vary therefrom. The method by which I accomplish this result may be outlined as follows: To the shaft which carries the generating-armature I apply a second armature of the type commonly employed in electric motors or engines, but of dimensions considerably smaller than those of the generating-armature. To this second armature I impart a tendency to revolve, and so modify the speed of revolution of the generating-armature as to offset or compensate the increases and decreases in current strength upon the circuit of said generating-armature. Further, in order that such modifications may be properly timed and proportioned to effect the desired regulation, I make them dependent upon the strength of the generated current. Thus I may cause the current to traverse the coils of said motor-armature, or of the electro-magnets which create its field, or both; or I may pass said current through differential helices surrounding the main helices of said motor field-magnets, or apply it in other equivalent ways, having in each case the same object in view—namely, to make the supplementary action of the motor appropriate in amount and direction to so modify the rate of revolution of the shaft as to correct the abnormal increases and decreases of current strength upon the working circuit.

There are two ways now known to me in which the theory of this invention may be practically carried out. In the first instance, the motor-armature may be given a tendency to revolve in a direction contrary to the normal revolution. In the second instance, it may be impelled in a direction similar thereto. Regarding the first of these methods, by causing the generated current to traverse the motor-armature and the coils of its field-magnets in such direction that a tendency is given to the motor-armature to oppose the normal revolution, any variation in the strength of current will actuate the motor to re-establish the normal strength. Regarding the second method, a tendency may be imparted to said motor-armature to revolve in the same direction with said generating-armature, and, as it were, to assist in the revolution. To regulate the current, it is then only necessary to modify the degree of assistance. This may be effected in a number of different ways. Thus, for example, a portion of the generated current may be caused to circulate through the coils of differential helices surrounding the main helices of the field-magnet of the motor, or changes in the strength of the generated current may be employed to introduce resistances into the circuit of the main helix of the field-magnet, or to withdraw them therefrom. Of the two methods thus cited for carrying the principles of my invention into effect I prefer that first mentioned, though I do not narrowly limit myself thereto, as I regard all others as its equivalent.

The exact subject-matter claimed as new will be hereinafter specifically designated.

Figure 2:
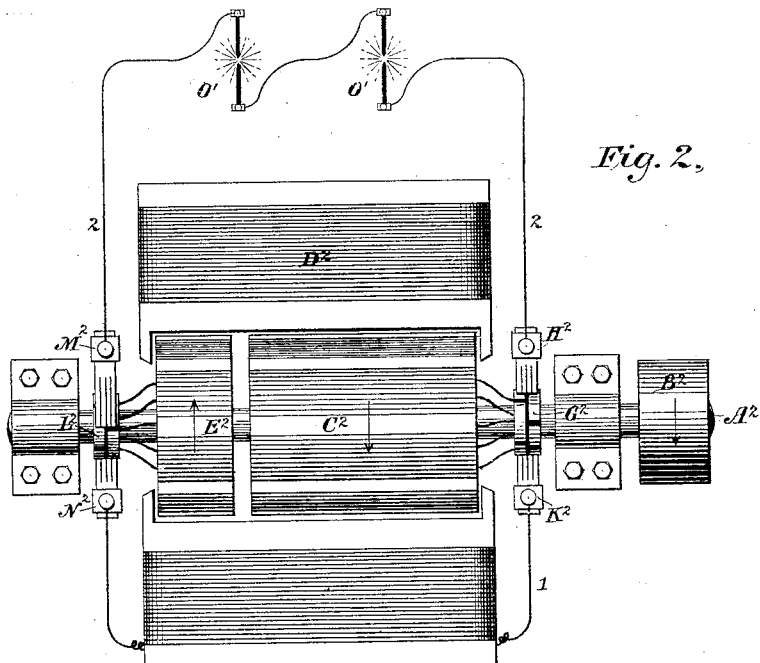
Figure 3:
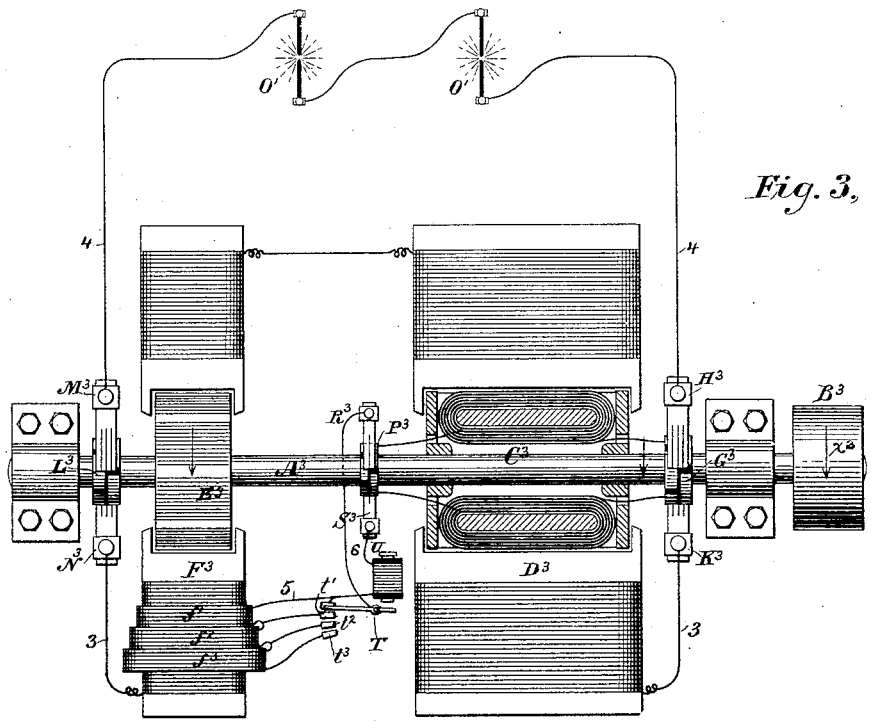

In the accompanying drawings, which illustrate my invention, Figure 1 is a theoretical diagram in which the armatures of the generator and motor are respectively provided with field-magnets. Fig. 2 is a like diagram showing both armatures as applied to a field of force established by a single system of electro-magnets. In each of these organizations the arrangement of circuits is such that a tendency is given to the armature of the motor to revolve in a direction opposite to that of the generating-armature. Fig. 3 is a theoretical diagram illustrating one method of organizing the apparatus when the motor-armature is made to impart to the armature-shaft a greater or less tendency to revolve in the direction of the revolution of the generating-armature according as the current traversing the external circuit of the same decreases or increases beyond its normal strength.

Similar letters of reference are applied to the corresponding parts appearing in the different figures.

Referring to Fig. 1, A' represents an armature-shaft rotated in the direction indicated by the arrow $x'$ by means of a driving-wheel applied to a pulley, B', or in any other well-known manner. Upon this shaft A' are mounted two armatures, C' and E', arranged to revolve, respectively, through the fields of force created by two systems of field-magnets, D' and F'. The armatures C' and E' may be of any convenient form, as their particular construction does not affect the principle of the invention. Likewise the precise construction of the field-magnets D' and F' is not material, and any of the types commonly employed in electric generators and motors may be made use of. In the diagrams I have represented them as electro-magnets; but permanent magnets may be substituted, if preferred. Each of the armatures is provided with a corresponding commutator, as shown at G' and L', respectively. The commutator G' is provided with two contact-brushes, H' and K', arranged to collect the currents or impulses generated in the coils of the armature C', according to their polarity. The commutator L' is provided with two contact-brushes, M' and N', for conveying the currents generated in the coils of the armature C' to the inducing-coils of the armature E' in a proper sequence to tend to rotate that armature in the direction indicated by the arrow $x^2$—that is to say, opposite to the direction of its actual revolution. In the figure I have represented the brush K' as connected by a conductor, 1, through the coils of the field-magnets D' and F', with the motor contact-brush N', and the brush H' as connected by means of a conductor, 2, constituting the work-circuit of the generator, with the contact-brush M' of the commutator L'. In the circuit of the conductor 2 may be included a system of electric lights, O', or other electrically-operated apparatus of any character.

The operation of the generator is as follows: Assuming that a positive current is caused to traverse the conductor 1 2 in the direction indicated by the arrow $y'$, by the revolution of the armature in the direction indicated by the arrow $x'$, the effect produced upon the motor-armature E' by the current traversing its coils through which the circuit is successively directed by means of the commutator L' is to create a tendency on the part of the motor-armature to oppose the movements of the drive-shaft and generating-armature. With every increase or decrease in the strength of the current upon the main line this tendency is increased or diminished correlatively. Thus, if for any cause the current traversing the external circuit be increased above its normal strength, the motor-armature will operate to increase the resistance of the armature-shaft and correspondingly decrease the rate of its revolution. The current generated in the coils of the armature will thereupon be lessened. When, on the other hand, the current falls below its normal strength, the opposing force exerted by the motor is decreased, and the shaft allowed to revolve with a greater rapidity, thereby raising the current to its normal strength.

In Fig. 2 I have represented the armature $C^2$ of the generator and the armature $E^2$ of the motor as both carried upon the shaft $A^2$ within the field of a single field-magnet, $D^2$. The arrangement of circuits relative to the armatures and commutators are in other respects the same as described with reference to Fig. 1, and the operation of the machine is precisely similar. In the construction shown in Fig. 2, however, the field of force for both armatures is practically of the same intensity, whereas in the former construction the fields of force of each armature may be made of such relative strengths as desired. It is also possible to apply the motor-armature to the drive-shaft in such manner that it will tend to rotate with the armature of the generator, instead of in the opposite direction. The motor-armature may then be considered as assisting in the rotation, and the strength of current upon the main line may be regulated by governing the degree of assistance thus rendered. To accomplish this the motor may be constructed and combined with the generator in the manner illustrated in Fig. 3, which shows an organization of the generating and inducing circuits practically the same as that described in connection with Fig. 1, except that the current generated is caused to traverse a series of neutralizing-coils surrounding the field-magnets of the motor. The commutator-brush $K^3$ is connected by a wire, 3, through the field-magnets $D^3$ and $F^3$, with the brush $N^3$ of the commutator $L^3$. The brush $H^3$ is connected through the work-circuit 4 with the remaining brush, $M^3$, of the commutator $L^3$. Supposing an armature, $C^3$, to be used provided with a circular series of coils, the outer ends of the coils might be connected with their respective commutator-segments in the usual manner; but the inner ends of the opposite coils, instead of being directly united with each other, may be connected with the segments of an additional commutator, $P^3$, the respective segments of which make contact with two brushes, $R^3$ and $S^3$. The brush $S^3$ is electrically connected by a conductor, 5, with one terminal of an opposing or neutralizing coil surrounding the field-magnet $F^3$. The opposite terminal of this coil is connected with the contact-plate $t'$ of a switch, T, and with one terminal of a second differential coil, $f^2$, the opposite terminal of which communicates with contact-plate $t^2$. This arrangement may be indefinitely extended. The arm T is connected by conductor 6 to the brush R³, and may be placed in contact with any one of these plates, as desired, either manually or automatically, by means of a motor or other suitable device, U, operated by currents traversing the conductor 5. The arrangement of the circuit connections with reference to the coils of the armature C³ and the commutators G³ and F³ are such that when by the revolution of the armature in the direction indicated by the arrow $x^3$ the outer ends of any two coils are placed in connection with the contact-brushes H³ and K³ the inner ends of the same coils will be in electrical connection with the brushes R³ and S³. A continuous current will thus be caused to flow through the conductors 5 and 6 and one or more of the opposing coils $f$. This current will be of the same strength as that traversing the main circuit, and is in fact the same current. If, therefore, the current generated increases beyond a normal strength, the switch T will be operated to include a greater number of the coils $f$ in the opposing circuit. The effect of including these coils is twofold: first, to correspondingly decrease the intensity of the field of force within which the motor-armature revolves, and, second, to increase the internal resistance of the armature, thereby diminishing its generative capacity. When, on the other hand, the current falls below its normal strength, the switch T acts to reduce the number of opposing coils in circuit, thus correlatively increasing the intensity of the field of force of the motor-armature E³, and decreasing the internal resistance of the generative armature. By properly adjusting the relative resistances of the several opposing coils $f$ to the action of the motor employed for controlling the position of the switch T the strength of the current generated may be rendered approximately constant.

I claim as my invention—

1. The combination, substantially as hereinbefore set forth, of a generating-armature, its shaft, a motor-armature mounted upon said shaft and tending under the influence of the generated current to revolve in a direction opposite to the direction in which said generating-armature revolves, and mechanical means for rotating said shaft.

2. The combination, substantially as hereinbefore set forth, of a shaft, a generating-armature mounted upon said shaft, a motor-armature of smaller dimensions than said generating-armature, also mounted upon said shaft, and electrical circuits for conveying the current generated in said generating-armature through the coils of said motor-armature, for the purpose of establishing a tendency to rotate it in the reverse direction to the motion of said shaft.

3. The combination, substantially as hereinbefore set forth, of a shaft, a generating-armature mounted upon said shaft, a motor-armature mounted upon said shaft, field-magnets vitalized by the current generated by said generating-armature, the electrical circuits, and commutators whereby the current is caused to traverse the coils of said motor-armature in the direction necessary to make it oppose the movement of said generating-armature.

4. The combination, substantially as hereinbefore set forth, of a shaft, a generating-armature mounted upon said shaft, and a motor-armature whose coils are connected in series with those of said generating-armature, also mounted upon said shaft, for the purpose of modifying the rotary movement of said shaft.

5. The method of regulating the current generated in a rotating armature, which consists in converting a fraction of the generated current into a mechanical force for directly opposing the rotation of said armature, substantially as herein set forth.

In testimony whereof I have hereunto subscribed my name this 6th day of January, A. D. 1883.

ROBERT J. SHEEHY.

Witnesses:
DANIEL W. EDGECOMB,
CHARLES A. TERRY.